United States Patent
Cortese

[11] Patent Number: 5,855,161
[45] Date of Patent: Jan. 5, 1999

[54] ESPRESSO COFFEE MACHINE

[75] Inventor: Virginio Cortese, Turin, Italy

[73] Assignee: Essegielle S.R.L., Turin, Italy

[21] Appl. No.: 774,030

[22] Filed: Dec. 27, 1996

[30] Foreign Application Priority Data

Jan. 16, 1996 [IT] Italy ................................ TO96A0017

[51] Int. Cl.⁶ .................................................. A47J 31/34
[52] U.S. Cl. ...................... 99/289 P; 99/295; 99/302 P
[58] Field of Search ........................... 99/289 P, 289 R, 99/289 T, 295, 302 P

[56] References Cited

U.S. PATENT DOCUMENTS

| | | | |
|---|---|---|---|
| 4,389,925 | 6/1983 | Piana | 99/289 R |
| 4,421,014 | 12/1983 | Vicker | 99/289 P |
| 4,829,889 | 5/1989 | Takeuchi et al. | 99/289 P |
| 5,490,447 | 2/1996 | Giuliano | 99/289 P X |

FOREIGN PATENT DOCUMENTS

| | | |
|---|---|---|
| 0093366 | 11/1983 | European Pat. Off. . |
| 0182939 | 6/1986 | European Pat. Off. . |
| 4203087 | 10/1992 | Germany . |
| 2205229 | 12/1988 | United Kingdom . |

*Primary Examiner*—Reginald L. Alexander
*Attorney, Agent, or Firm*—Ladas & Parry

[57] ABSTRACT

An espresso coffee machine wherein a conveyor disk, having a number of seats, each for receiving a respective wafer, is rotated in steps about an axis to successively feed the seats through a loading station for loading the wafers, an unloading station for unloading the used wafers, and a work station where each seat is interposed between a hot-water boiler and an outlet element for a coffee beverage, and is engaged by the boiler by virtue of pressurized cold water supplied to the boiler.

12 Claims, 2 Drawing Sheets

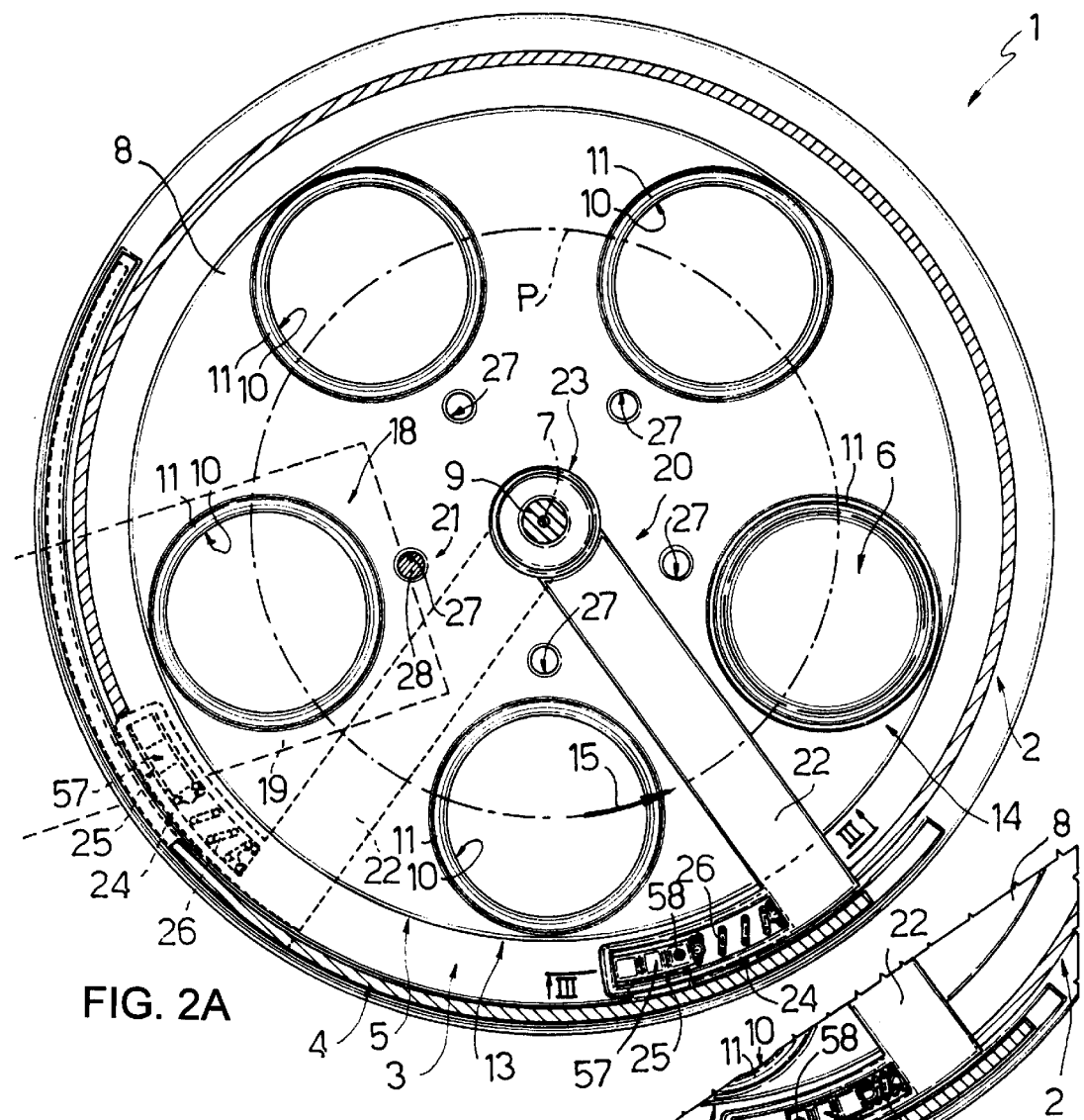
FIG. 2A
FIG. 2B
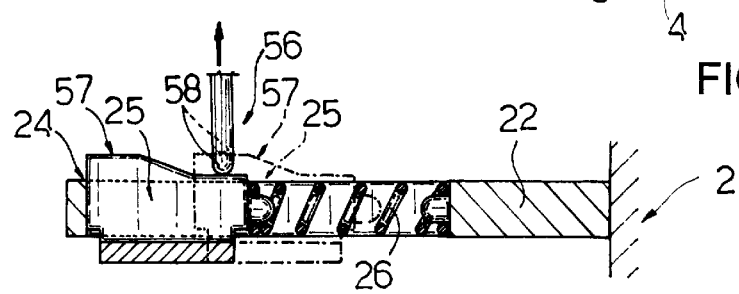
FIG. 3

ESPRESSO COFFEE MACHINE

BACKGROUND OF THE INVENTION

The present invention relates to an espresso coffee machine.

More specifically, the present invention relates to an espresso coffee machine loaded with ground coffee wafers.

Espresso coffee machines of this type normally pose two problems, the first of which involves unloading of the used wafers from the machine, and the second the adaptability of the machine, not only to the size of the wafers, which invariably differs slightly from one wafer to another, but also to wafers of different coffee dosages.

SUMMARY OF THE INVENTION

It is an object of the present invention to provide an espresso coffee machine designed to solve the above two problems in a straightforward, low-cost manner.

According to the present invention, there is provided an espresso coffee machine comprising a work station; a boiler located at the work station and having outlet means for a stream of hot water; an outlet conduit for a coffee beverage; a seat for at least one wafer of ground coffee, the seat being interposed between said outlet means and the outlet conduit; supply means for supplying pressurized water to the boiler; and connecting means for connecting in fluidtight manner said outlet means and a said wafer located, in use, in said seat at said work station; characterized by also comprising a loading station and an unloading station for the wafers, the loading and unloading stations being separate from the work station and being located on the opposite side to the work station; a conveyor disk having a number of said seats; and actuating means for rotating the conveyor disk in steps about an axis to successively feed the seats through said loading, work and unloading stations, each seat being interposed, at the work station, between said outlet means and the outlet conduit; and said connecting means being hydraulic connecting means connected to an outlet of said supply means, parallel to said boiler.

BRIEF DESCRIPTION OF THE DRAWINGS

A non-limiting embodiment of the invention will be described by way of example with reference to the accompanying drawings, in which:

FIGS. 2A and 2B show a schematic cross section of the FIGS. 1A and 1B machine; and FIG. 3 shows a larger-scale side view of a detail of FIGS. 2A and 2B.

DETAILED DESCRIPTION OF THE INVENTION

Figure 1A:
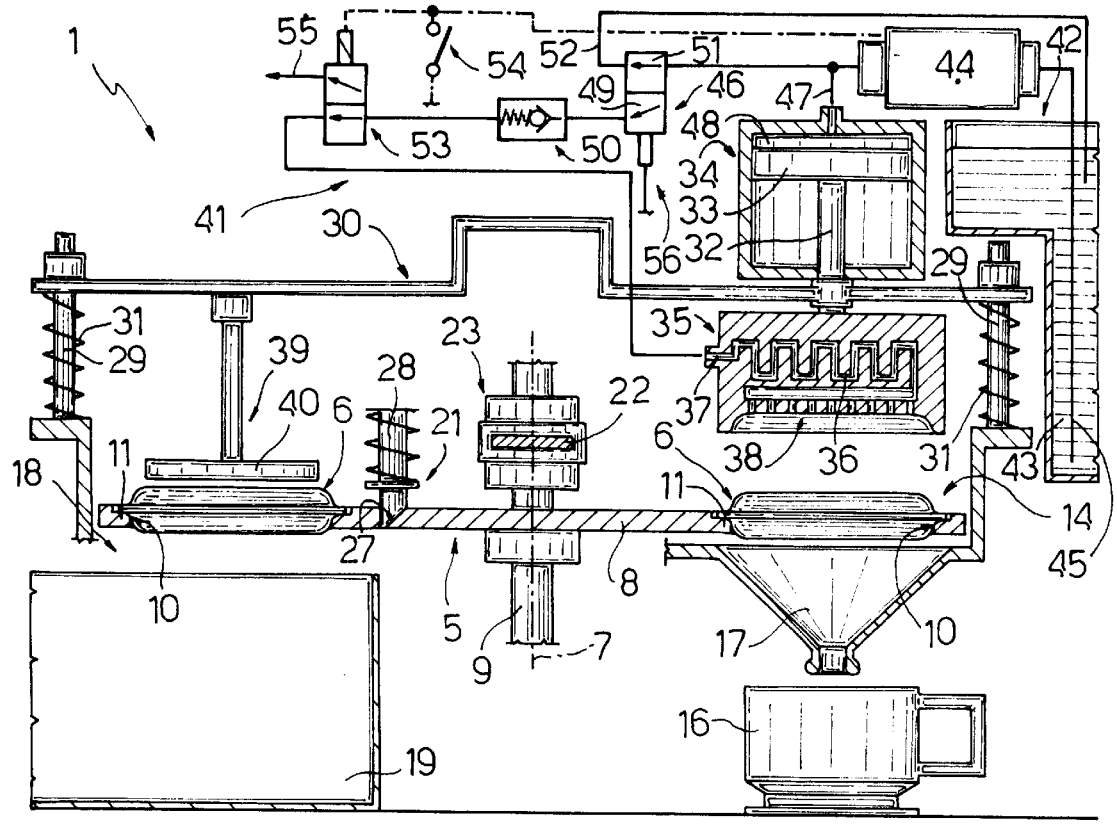
FIGS. 1A and 1B show a schematic view, with parts removed for clarity, of a preferred embodiment of the coffee machine according to the present invention in two different operating positions.

Number 1 in the accompanying drawings indicates an espresso coffee machine comprising an outer casing 2 (FIGS. 2A and 2B) having a loading window 3 controlled by a door 4, which is slidable counterclockwise in FIGS. 2A and 2B between an open position and a closed position respectively opening and closing window 3; and a conveyor unit 5 housed inside casing 2 and for successively feeding wafers 6 of ground coffee along a given path P extending about a substantially vertical axis 7.

As shown more clearly in FIG. 2A and 2B, unit 5 comprises a revolving disk 8 fitted to a shaft 9 coaxial with axis 7 to rotate in steps, anticlockwise in FIGS. 2A and 2B, about axis 7, and having a number of through holes 10, each having an edge defining a seat 11 for supporting the peripheral flange of a respective wafer 6 of ground coffee.

As shown in FIGS. 2A and 2B, path P extends through three stations, of which the first, indicated 13, is located at window 3 and is a loading station where each seat 11 receives a respective wafer 6 placed manually in seat 11; the second, indicated 14, is located one step downstream from station 13 in the traveling direction 15 of seats 11, and is a work station where a stream of hot water is fed through each wafer 6 to produce a coffee beverage, which is fed out of casing 2 and into a container or cup 16 through a funnel-shaped spout 17 beneath disk 8; and the third, indicated 18, is located between stations 14 and 13 in direction 15, and is an unloading station where the by now exhausted wafer 6 is unloaded through respective seat 11 into a removable collecting bin 19 beneath disk 8.

Disk 8 is associated with an actuating device 20 for rotating disk 8 in steps about axis 7; and with a lock device 21 for arresting disk 8 in a given angular position at the end of each step.

As shown schematically in FIGS. 2A and 2B and 3, actuating device 20 comprises a lever 22 connected to shaft 9 by a free-wheel device 23, which is so formed that lever 22 and shaft 9 are only angularly integral with each other as lever 22 rotates anticlockwise in FIGS. 2A and 2B.

As shown more clearly in FIG. 3, device 20 also comprises a hollow body 24 fitted integrally to the free end of lever 22 and extending from lever 22 in the opposite direction to direction 15; and a slide 25 housed inside body 24 so as to slide in opposition to a spring 26. Slide 25 is connected to door 4, and is movable with door 4 in direction 15 and in opposition to spring 26 so that, when door 4 is moved from the open to the closed position, lever 22 is moved in direction 15, disk 8 is therefore moved one step forward in direction 15, and slide 25 subsequently slides along body 24 into a limit stop position.

Lock device 21 comprises a number of cavities 27 equal in number to holes 10 and spaced along the periphery of disk 8 by a distance equal to the traveling step of seats 11; and a spring bolt 28 located in a fixed position facing disk 8 and for selectively engaging cavities 27 to arrest disk 8 at the end of each step.

Figure 1B:
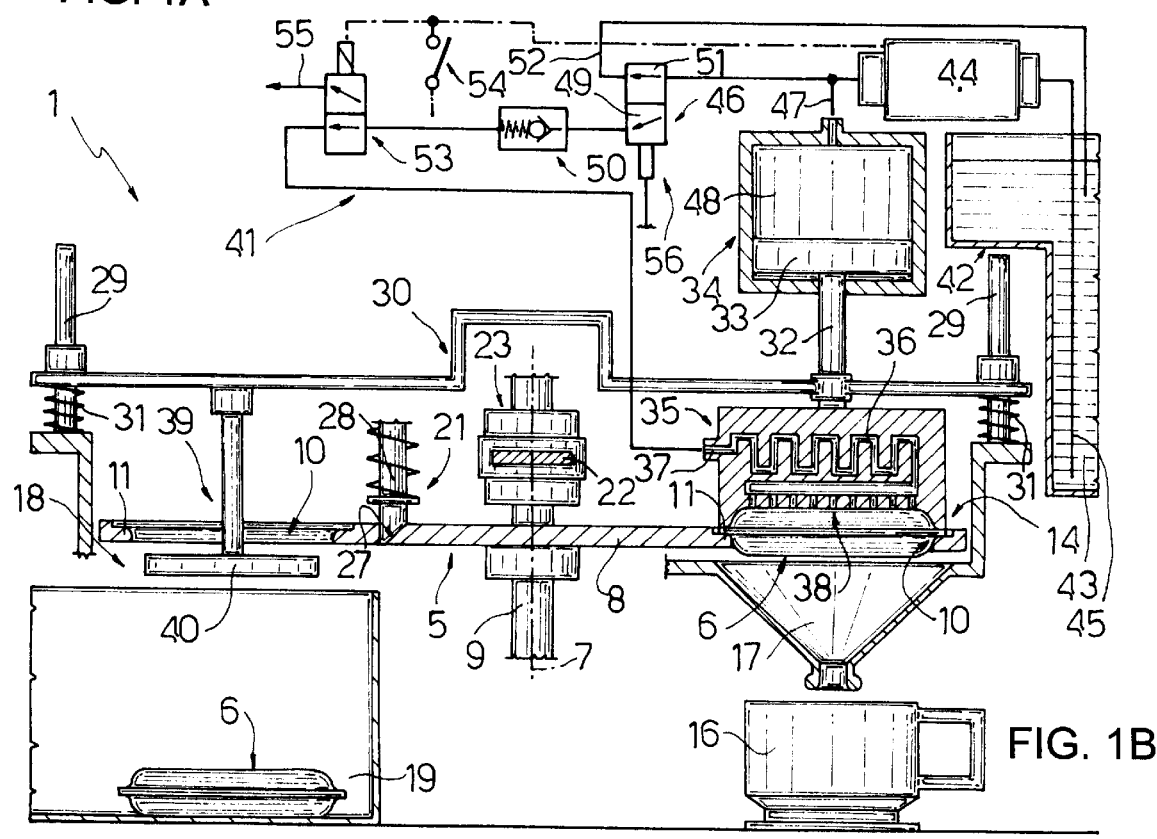

As shown in FIGS. 1A and 1B, casing 2 is provided inside with two pins 29 parallel to axis 7 and connected in sliding manner to the opposite ends of a crosspiece 30 located over disk 8 and crosswise to axis 7. Crosspiece 30 is movable, in opposition to springs 31 and by a rod 32 of a piston 33 sliding inside a hydraulic cylinder or actuator 34 with its axis parallel to axis 7, from a raised idle position (FIG. 1A) to a lowered operating position (FIG. 1B).

Crosspiece 30 is fitted integrally with a dry boiler 35 located at work station 14 and comprising an inner heating coil 36, which communicates at one end with a water supply conduit 37, and at the other end with a discharge sprinkler 38 located over spout 17.

Crosspiece 30 is also fitted integrally with an ejecting device 39 comprising a pusher 40, which extends downwards from crosspiece 30 and parallel to axis 7 at unloading station 18, and is of such a length as to be positioned over disk 8 when crosspiece 30 is in the idle position, and to extend through hole 10 when crosspiece 30 is in the operating position.

Conduit 37 forms the outlet conduit of a hydraulic circuit 41 comprising a tank 42 for a given quantity of water 43, and an electromagnetic pump 44, an inlet of which is connected to tank 42 by a draw tube 45, and an outlet of which is connected to an inlet of a three-way mechanical valve 46. Of these three ways, the first, indicated 47, is always open and communicates permanently with an upper chamber 48 of cylinder 34; the second, indicated 49, connects the outlet of pump 44 to the inlet of a calibrated nonreturn valve 50; and the third, indicated 51, connects the outlet of pump 44 and chamber 48 to a return conduit 52 leading back to tank 42.

Valve 50 forms an inlet section of an electromagnetic valve 53, which, together with pump 44 and boiler 35, is controlled by a switch 54, and comprises a first outlet communicating with an inlet of conduit 37, and a second outlet communicating with an external discharge conduit 55.

Valve 46 is switched by a switching device 56 comprising a cam 57 fitted to slide 25; and a tappet rod 58 located along the path of cam 57, immediately upstream from station 14. Rod 58 is connected to a slide (not shown) of valve 46, and cooperates with cam 57 so that the movement of cam 57 along body 24 in opposition to spring 26 and towards its limit stop position opens the second way 49 of valve 46.

Operation of machine 1 will now be described as of the instant in which a seat 11 is located at loading station 13; door 4 is open; switch 54 is open so that pump 44 is deactivated and conduit 37 communicates with discharge conduit 55; rod 58 is disengaged by cam 57 and set to the lowered idle position, which corresponds to a configuration of valve 46 wherein the outlet of pump 44 and chamber 48 of cylinder 34 communicate with tank 42 via way 51; and piston 33 is set to the raised position.

With the machine in the above configuration, the operator loads a fresh wafer 6 through window 3 and into seat 11 at loading station 13 to close respective hole 10, and then closes door 4 to close window 3. As a result, lever 22 rotates, anticlockwise in FIG. 2, about axis 7, so that disk 8 rotates, in direction 15, from a position wherein bolt 28 engages one cavity 27, to a position wherein bolt 28 engages the next cavity 27, thus locking disk 8 in such an angular position that the fresh wafer 6 is fed one step forward and located between sprinkler 38 of boiler 35 and spout 17 at work station 14; an exhausted wafer 6 is fed one step forward into unloading station 18 and beneath pusher 40; and a vacant seat 11 is fed one step forward into loading station 13. Once disk 8 and lever 22 are locked by bolt 28 in the position described above, door 4 closes further to move slide 25 along hollow body 24 in opposition to spring 26, so that rod 58 is raised, and maintained raised, by cam 57 to close way 51 and open way 49 of valve 46. When switch 54 is then closed by the operator, pump 44 and boiler 35 are activated, and valve 53 moves into the position connecting the outlet of valve 50 to conduit 37.

At this point, the water from pump 44 is arrested by valve 50 and flows through way 47 into chamber 48 of cylinder 34; and piston 33 and crosspiece 30 are moved downwards in opposition to springs 31, so that boiler 35 is lowered to connect sprinkler 38 in fluidtight manner to the fresh wafer 6, and pusher 40 is lowered to extrude the exhausted wafer 6 through respective hole 10 and into the underlying bin 19.

When the downward movement of piston 33 is arrested by sprinkler 38 contacting wafer 6, the pressure upstream from valve 50 increases so as to successively open valve 50, supply cold water to boiler 35, heat the water, feed the hot water through wafer 6, and feed the coffee beverage out through spout 17.

Once the coffee beverage has been dispensed, the operator again operates switch 54 to deactivate pump 44 and boiler 35 and connect conduit 37 to discharge conduit 55 to externally discharge any water and steam remaining inside coil 36.

When door 4 is subsequently opened to load another fresh wafer 6, rod 58 is disengaged by cam 57 so as to close way 49 and open way 51 of valve 46. As a result of the above movement of valve 46, the cold water inside chamber 48 is fed back into tank 42, and piston 33 moves back up, together with crosspiece 30, pusher 40 and boiler 35, to disengage disk 8 and enable preparation of another coffee beverage.

Several points should be stressed in connection with the above. Firstly, cylinder 34 is supplied with cold water, which therefore need not be drained off, but may be fed back into tank 42 and used again. This characteristic provides for using even a relatively long cylinder 34, and for achieving excellent sealing, as a function of the setting of valve 50, between sprinkler 38 and wafer 6, regardless of the thickness of wafer 6, which may comprise one or two doses.

Moreover, the adoption of disk 8 provides for separating stations 13, 14 and 18, and for automatically unloading the exhausted wafers so that loading station 13 is supplied with only vacant seats 11.

Finally, by virtue of boiler 35 adapting automatically to wafers 6 of different thicknesses, both single- and two-dose wafers may, as stated, be used indifferently. For example, according to a variation not shown, disk 8 may comprise two sets of three alternating holes 10, a first set suitable for single-dose wafers 6, and a second set for two-dose wafers 6.

I claim:

1. An espresso coffee machine comprising:

a work station (14), a loading station (13) and an unloading station (18) for wafers (6), said loading and unloading stations (13, 18) being separate from said work station (14);

a boiler (35) having an outlet (38) for providing a stream of hot water;

a spout (17);

supply means (41) for supplying pressurized water to said boiler (35);

a conveyor disk (8) having a number of seats (11) respectively for said wafers;

actuating means (20) for rotating said conveyor disk (8) in steps about an axis (7) to successively feed said seats (11) through said loading (13), work (14) and unloading (18) stations, each one of said seats (11) and, thereby, said wafers (11) being interposed at said work station (14) between said outlet (38) and said spout (17);

hydraulic connecting means (34) connected hydraulically to said supply means (41) in parallel to said boiler (35) for connecting said outlet (38) and said one of said seats (11) interposed at said work station (14) in a fluidtight manner;

a pusher (40) located at said unloading station (18); and a hydraulic actuator (33) connected hydraulically to said supply means (41) and connected mechanically to said pusher (40) to move said pusher (40) through each of said seats (11) as successively fed through said unloading station (18) between a raised idle position and a lowered operating position.

2. A machine as claimed in claim 1, characterized in that said connecting means (34) support said boiler (35) and comprise said hydraulic actuator (33), which is also mechanically connected to said boiler (35) to move the boiler (35) to and from said disk (8) between said raised idle position and said lowered operating position wherein said outlet means (38) cooperate, in use, in fluidtight manner with a wafer (6) housed in a said seat (11) at the work station (14).

3. A machine as claimed in claim 1, further comprising a movable output member (32) connected to said hydraulic actuator 33; a crosspiece (30) connected to said output member (32) and extending across said work and unloading stations (14, 18), the crosspiece being movable with said output member (32) between a raised idle position and a lowered position; said pusher (40) and said boiler (35) being connected to said crosspiece (30) to move, with the crosspiece (30), between said raised idle position and said lowered operating position.

4. A machine as claimed in claim 1, wherein said supply means (41) comprise a hydraulic circuit (41) in turn comprising a tank (42) for a given quantity of water (43), a pump (44) and a draw tube (45) connecting the tank (42) to an inlet of the pump (44); and a first valve (46) having three ways, of which a first (47) is always open and communicates permanently with said hydraulic actuator (33), a second (49) is interposed between an outlet of said pump (44) and an inlet of said boiler (35), and a third (51) connects the outlet of the pump (44) and said first way (47) to said tank (42).

5. A machine as claimed in claim 4, wherein said supply means (41) comprise a second nonreturn valve (50) interposed between said second way (49) and said boiler (35).

6. A machine as claimed in claim 5, wherein said supply means (41) comprise a third valve (53) having an inlet communicating with an outlet of said second valve (50), a first outlet communicating with said boiler (35), and a second outlet communicating with a drain (55).

7. A machine as claimed in claim 6, wherein said third valve (53) is an electromagnetic valve comprising a control switch (54), which provides for switching the third valve (53) and for activating and deactivating said pump (44).

8. A machine as claimed in claim 4, wherein said first valve (46) is a mechanical valve; mechanical switching means (56) being provided to selectively open said second and third ways (49, 51).

9. A machine as claimed in claim 8, wherein said switching means (56) comprise a slide (25), a cam (57) fitted to said slide (25), and a tappet rod (58) for controlling the first valve (46); the tappet rod (58) being movable by said cam (57) between a normal position opening said second way (49), and an operating position opening said third way (51).

10. A machine as claimed in claim 9, wherein said actuating means (20) comprise a reciprocating actuating element (4) for performing a given back and forth movement; one-way transmission means (22, 23) interposed between said actuating element (4) and said disk (8) to move the disk (8) one step forward for each forward movement of the actuating element (4); and elastic connecting means (24, 25, 26) interposed between said transmission means (22, 23) and said actuating element (4); said elastic connecting means (24, 25, 26) incorporating said slide (25) and said cam (57).

11. A machine as claimed in claim 10, wherein said elastic connecting means (24, 25, 26) comprise a hollow body (24) integral with said transmission means (22, 23) and housing said slide (25) in sliding manner; and elastic means (26) interposed between the slide (25) and the transmission means (22, 23); the slide (25) being movable with said actuating element (4).

12. A machine as claimed in claim 11, wherein by comprising a casing (2) enclosing said disk (8) and said stations (13, 14, 18); the casing (2) having a loading window (3) at said loading station (13), and a sliding door (4) for closing said window (3); said door (4) constituting said actuating element (4).

* * * * *